(12) United States Patent
Mostovych (10) Patent No.: US 9,043,925 B2
(45) Date of Patent: *May 26, 2015

(54) METHOD AND APPARATUS FOR PREVENTION OF TAMPERING AND UNAUTHORIZED EXTRACTION OF INFORMATION FROM MICRODEVICES

(71) Applicant: Andrew N. Mostovych, Silver Spring, MD (US)

(72) Inventor: Andrew N. Mostovych, Silver Spring, MD (US)

(73) Assignee: Enterprise Sciences, Inc., College Park, MD (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/692,545

(22) Filed: Dec. 3, 2012

(65) Prior Publication Data

US 2014/0115714 A1  Apr. 24, 2014

Related U.S. Application Data

(63) Continuation-in-part of application No. 12/191,725, filed on Sep. 11, 2008, now Pat. No. 8,332,661.

(51) Int. Cl.
*G06F 21/60* (2013.01)
*G06F 21/86* (2013.01)
*G06F 21/55* (2013.01)

(52) U.S. Cl.
CPC .............. *G06F 21/86* (2013.01); *G06F 21/554* (2013.01); *G06F 2221/2143* (2013.01)

(58) Field of Classification Search
CPC .......................... G06F 21/86; G06F 221/2143
USPC .......................................................... 726/26
See application file for complete search history.

(56) References Cited

U.S. PATENT DOCUMENTS

| | | | | |
|---|---|---|---|---|
| 5,353,350 | A * | 10/1994 | Unsworth et al. | 713/194 |
| 2001/0056543 | A1 * | 12/2001 | Isomura | 713/200 |
| 2005/0151777 | A1 * | 7/2005 | Silverbrook | 347/19 |
| 2008/0028477 | A1 * | 1/2008 | Lehmann et al. | 726/36 |
| 2008/0091605 | A1 * | 4/2008 | Hughes et al. | 705/51 |
| 2012/0131673 | A1 * | 5/2012 | Caci | 726/23 |
| 2013/0024660 | A1 * | 1/2013 | Silverbrook | 712/42 |

* cited by examiner

*Primary Examiner* — Andrew Goldberg
*Assistant Examiner* — Carlos Amorin
(74) *Attorney, Agent, or Firm* — Miodrag Cekic; Intellectual Property Strategists, L.L.C.

(57) ABSTRACT

A system for protection of information on a secured microdevice, including a control unit, an obliteration driver, and a circuit arranged to conduct the at least one pulse of electric current. The circuit incorporates at least one resistive load having a localized predetermined resistance such that the delivered portion of stored electric energy is locally resistively converted into a mechanical energy of motion during a time period shorter than a duration of time needed for heat diffusion out a volume in the proximity of the at least the fraction of stored information.

19 Claims, 8 Drawing Sheets

METHOD AND APPARATUS FOR PREVENTION OF TAMPERING AND UNAUTHORIZED EXTRACTION OF INFORMATION FROM MICRODEVICES

RELATED APPLICATIONS

This application is a Continuation in Part application of the copending and coowned U.S. patent application Ser. No. 12/191,725 filed on Sep. 11, 2008 which is incorporated here by reference in its entirety.

STATEMENT REGARDING FEDERALLY SPONSORED RESEARCH AND DEVELOPMENT

This invention was made with Government support under Contracts No. W31P4Q-06-C-0401 and No. W31P4Q-08-C-0276 awarded by the US Army Aviation and Missile Command at Redstone Arsenal, Alabama. The US Government has certain rights in the invention.

FIELD OF THE INVENTION

The invention relates to an apparatus and a method for prevention of tampering, unauthorized use, and unauthorized extraction of information from information containing regions of microdevices which include but are not limited to electric, electromagnetic, electronic, photonic, electro-mechanical, electro-chemical, electro-fluidic, and hybrid devices having microscopic or sub-microscopic structural or functional components. The information under protection from unauthorized access can include any or all of: stored data, incompletely erased data, prearranged structures or physical device architectures containing intrinsic information about functions, programs, designs, or fabrication processes of the microdevice under protection. The targeted microdevice may operate as an individual device or be assembled as a constituent of a more complex processing device having a plurality of microdevices arranged and programmed to perform a plurality of processes or applications. The protection from tampering, unauthorized use, and unauthorized extraction of information is achieved by irreversible obliteration of the information containing structures and media using electrical energy from high power electrical drivers that is delivered and deposited in or in the vicinity of individual microdevices or targeted microdevices that are connected to other constituents of the processing devices.

BACKGROUND OF THE INVENTION

The prevention of tampering, unauthorized use, and unauthorized extraction of information from microdevices is a long standing and extensive multidisciplinary problem. The strategies of prevention can range from secrecy protection of designs and production processes of a particular microdevice to the broad area of data encryption and protected data exchange and storage. The domain of the present invention is protection of stored and structure-related information incorporated in microdevices by the physical destruction of the microdevice regions containing such information in the event that tampering, unauthorized use, and/or unauthorized extraction of such information is likely to occur. Various embodiments of the present invention include usage of high power electrical drivers that deliver sufficient electrical energy for permanent destruction of the information containing structures of protected microdevices.

Currently, the most common example of a micro-device that may need to be protected from tampering, unauthorized use, and unauthorized extraction of information is the electronic microchip also commonly known as an "integrated circuit". Electronic microchips are ubiquitous in industrial, military, and consumer products. With this in mind, some of the presented embodiments of the invention are illustrated and evaluated using an electronic microchip as a target. However, it is important to note that the present invention is not limited to electronic devices or microchips. Apparatuses and methods in accordance with the present invention can be used to obliterate information on a variety of microdevices including, but not limited to, magnetic memory strips and media; removable memory modules and cards; security identification cards, chips, and keys; RFID tags and interrogators; MEMS; biochips; sensors; and other electronic, electro-mechanical, photonic, fluidic, chemical, and hybrid devices.

In some embodiments of the current invention, high power pulsed technology may selectively obliterate targeted information containing structures by providing a controlled high power discharge in the proximity of the information containing structures. Various embodiments of the present invention include methods and devices invented for commanded and/or self directed obliteration of the information containing structures under situations where physical control of protected microdevices may not be present, and where it is necessary to prevent hostile and/or unauthorized users from gaining and benefiting from the use of the microdevice or from the information contained in the microdevice even if they gain physical control of the protected microdevice. These embodiments usually require protection devices designed to integrate with the microdevices either permanently or as additional safety modules which, in an off or stand-by mode of operation, allow for normal function of the processing microdevices, but when activated obliterate the targeted information. Many of these embodiments can also be used to obliterate sensitive information and incompletely erased data on replaced or discarded microdevices before they are disposed or removed from the controlled environments.

An embedded load assembly arranged to localize energy dissipation, is an important element of the present Anti-Tampering (AT) technology of certain embodiments of t he current invention. One embodiment may a localized weakly resistive conductor tamped within the volume of a substrate, directly below a silicon die or any other delicate device needing AT protection. The application of a fast high voltage pulse to this conductor may cause a flow of intense currents and commensurate abrupt heating in the conductor. As the conductor heats, its resistance may increase, coupling more power from associated high voltage drivers and further h eating the conductor. This process substantially instantly (relative to the duration of the discharge) melts, vaporizer, and partially Ionizer the conductor, further producing significantly elevated pressures in the confined volume of the conductor as well as resulting intense shock waves in the substrate and relatively more delicate devices that may be mounted on it. The shock-associated pressures may exceed fracture strength of the substrate /die systems, resulting in substantially instant and thorough destruction of mounted dies and/or other protected structures.

SUMMARY OF THE INVENTION

The current invention pertains to a system for prevention of tampering, unauthorized use, and unauthorized extraction of information from at least one secured microdevice. The system incorporates a control unit arranged to generate a command to trigger a controlled obliteration of at least a fraction of stored information on the at least one secured microdevice; an obliteration driver arranged to store electric energy and to generate, when triggered by the control unit, at least one pulse of electric current; a circuit arranged to conduct the at least one pulse of electric current toward at least one resistive dissipative load structure arranged in a proximity of the at least the fraction of stored information on the at least one secured microdevice, and connected to controllably release the delivered portion of stored electric energy in the proximity of the at least the fraction of stored information on the at least one secured microdevice, such that the at least the fraction of stored information has been obliterated during the controllable release.

The circuit arranged to conduct the at least one pulse of electric current incorporates at least one resistive load having a localized predetermined resistance such that the delivered portion of stored electric energy is locally resistively converted into a mechanical energy of motion during a time period shorter than a duration of time needed for heat diffusion out a volume in the proximity of the at least the fraction of stored information.

DETAILED DESCRIPTION OF THE INVENTION

Several embodiments of a secured processing device 100 incorporating dissipative load structures 605 have been disclosed in the incorporated parent application Ser. No. 12/191,725 (for example, in FIGS. 7,8,10-13 . and pertinent paragraphs [0036]-[0044]).

In one class of such embodiments, a short section of ultrathin metal wire may be used as the dissipative load structure 605 (FIG. 7 . of the parent application Ser. No. 12/191,725). For example, a 5 mm long section of 40 gauge copper wire (diameter of approximately 0.03 mm, resistance of approximately 0.017 ohms) may be an effective dissipative load structure 605 . The discharge current trace of FIG. 9, parent application Ser. No. 12/191,725, may be from an experiment utilizing such a dissipative load structure 605 for the destruction of an integrated memory chip as described in detail in paragraph [0038] of the parent application Ser. No. 12/191,725.

Figure 2:
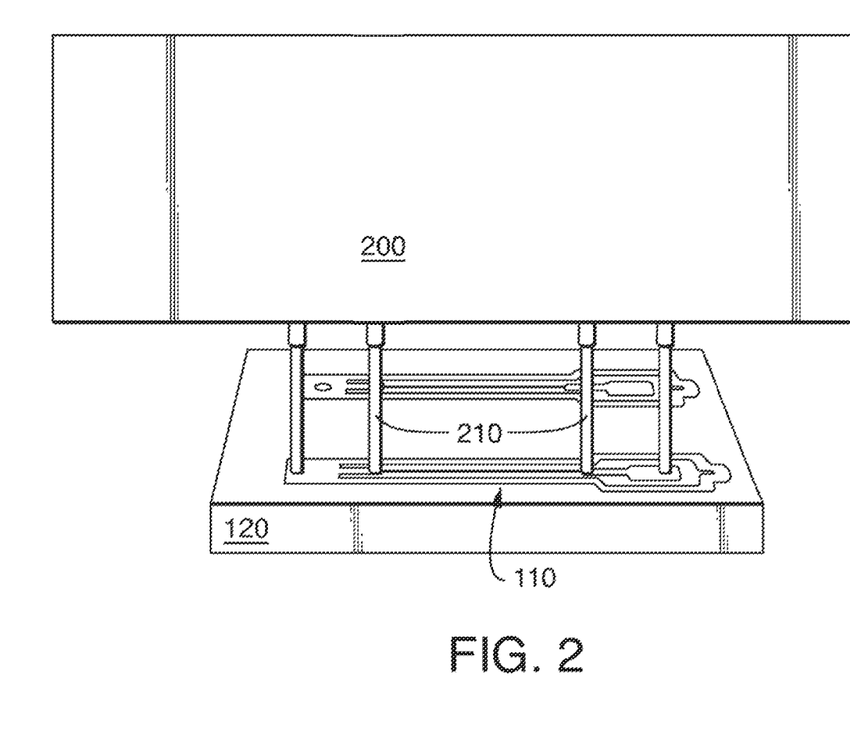
FIG. 2. is an illustration of another embodiment of the current invention.

In another class of such embodiments, a localized electro-etching of thick copper wires may be used to produce dissipative load structures 605 with reliable connectivity for incorporation into a variety of secured processing devices 100 (FIG. 2 of the parent application Ser. No. 12/191,725). Here, a plurality of relatively thicker wire regions 555, as in FIG. 7 of the parent application, may provide reproducible high current connections to external drivers, while the thinner etched regions may have sufficient resistivity to function as an exploding element. The naturally etched taper between the thicker and thinner regions may also ensure that there is no discontinuity and no undesired localized heating between the two regions.

Figure 1:
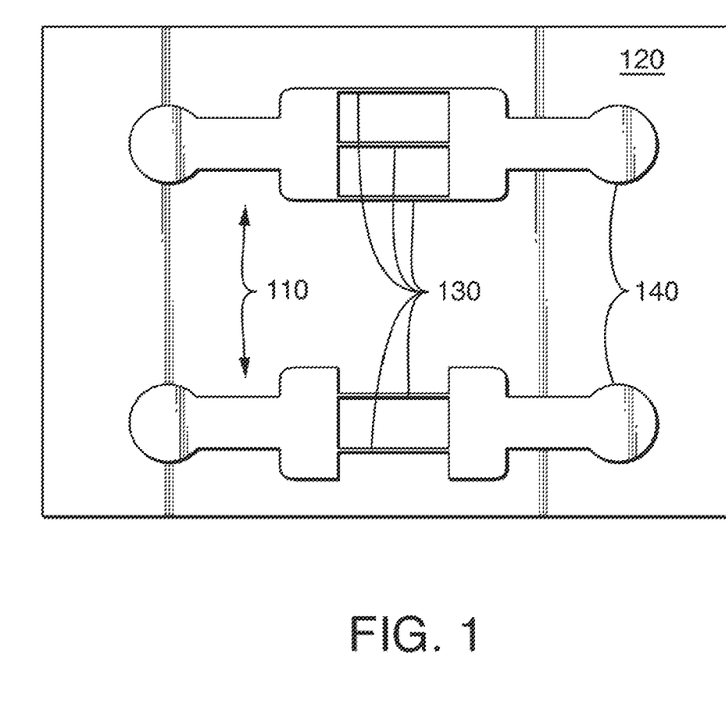
FIG. 1. is an illustration of one embodiment of the current invention.

In different embodiments, the dissipative load structures 605 (FIG. 7 of the parent application) may incorporate one or more resistors having a predetermined resistance. As illustrated in FIG. 1, the resistive loads 110, having resistors 130 of a predetermined resistance, may be fabricated as free standing or on the surface or in the volume of a substrate by processing of or with a conductive, semi-conducting, or insulating material using a set of preparatory actions consisting of (but not limited to): casting, molding, pressure forming, ablation, extrusion, sintering, printing, film depositing, lithographic forming, doping, cutting, milling, turning, etching, chemically depositing (from vapors, solutions, sol gel preparations and reactive media), chemical etching, implanting (neutral and ion), plasma processing, and mixtures and combinations of above actions. The above actions and processes may be modified by the practitioners for enhanced properties of the resistive loads such may be dimensional parameters, total resistance, resistivity distributions, thermodynamic parameters, chemical properties, and similar characteristics.

In one exemplary class of the above embodiments, thick-film circuit printing may be used to fabricate the resistive loads 110. With thick-film printing (known in the field of electric and electronic systems) intricate patterns and multiple layers of conductors, resistors, and insulators can be printed as thick (e.g., 0.01-500 μm) films on ceramic substrates. Predetermined conductive, resistive, or insulating inks and/or pastes may be applied to the ceramic substrates using screen, or stencil printing techniques and may be "fired" at elevated temperatures to fix the applied substances and adhere them to the substrates. Additional or subsequent layers may produce a final three-dimensional structure that may function as a combined microelectronic circuit including conductors, resistors, capacitors, inductors and/or more complex arrangements and combinations. Such hybrid circuits may not be necessarily limited to passive components; they may include microchips, bare semiconductor die, or any other surface or wire mount active or passive components. It may be well known that semiconductor die can be readily bonded to such hybrid circuits and that, in turn, the hybrid circuits may be installed in plurality of Integrated Circuit (IC), electronic device, electronic system, microdevice, and microdevice system packages provides for an efficient path to incorporate embedded loads into a variety of packaged devices requiring AT protection.

More particularly, in the pertinent embodiment illustrated in FIG. 1. of the current application, two separate resistive loads 110 have been generated on the surface of a ceramic substrate 120 (commercial Shapal-M™ Aluminum Nitride based ceramic) by screen printing and high temperature firing of thick film silver paste to form a 3D thick film relief (approximately 12 μm thick) for resistors 130 (typically 75-250 μm wide and 1-5 mm long) and associated lower resistance high current feeds 140. While silver may be customarily considered to be a very good conductor, the very narrow feature size of the resistors 130 and the restricted thickness of the printed loadfilm may produce the predetermined (e.g. 1-500 milliohm) resistance.

In different embodiments, a 3D thick film may be deposited as an inlay into the volume of a ceramic substrate 120 that may be processed to produce structured cavity patterns for the inlay. Various methods including, but not limited to, machining, laser machining, etching, molding, or pressing of hard or green ceramic may be used to produce the required 3D cavity for the inlay. One may chose machining because of its relative simplicity, flexibility, and low start-up costs. A computer numerically controlled (CNC) milling machine with reasonably high precision capability may be set up for this purpose. The CNC machine may be outfitted with high-speed motorized and/or air-driven turbine spindles to permit machining with end-mill tooling in the range of 20 μm-5000 μm in diameter and to tolerances in the range of 1 μm or less. A commercial machinable glass-ceramic (e.g. MACOR™ as originally developed and sold by the Corning Inc.) may be chosen as an appropriate ceramic substrate material. Such a material may be readily machinable using carbide or diamond machine tools, and may be compatible with the required high temperature profiles for thick-film firing, as it effectively does not change its final dimensions as a result of the firing, it is nonporous, and it is both a reasonably good insulator and a high frequency dielectric.

After machining, the ceramic substrate 120 may be cleaned and the machined regions may be filled with a thick-film conductive or resistive paste. Also, can printing or stencil printing techniques may be further use d to control the deposition of thick film paste directly into the patterned cavities. Pastes containing, for example, silver, palladium, glass frit, and appropriate organic binders and/or solvents may be used for the particular embodiments. After filling, the samples may be fired. in an oxidizing atmosphere with a temperature profile chosen to drive out volatiles, oxidize the organic binders, sinter the remaining non-organic mixture, and fuse the paste to the ceramic substrate 120. in embodiments using deeper cavities, the filling and firing steps may need to be repeated until the paste inlay fully fills the cavity. After filling and firing, the surface: of the conductive paste forming resistors 130 and current feeds 140 may be additionally polished to provide a flush load-ceramic surface and an accurately reproducible load 110.

Some embodiments may also benefit from a final quality control step implemented to characterize resistive loads 110 in terms of their electrical resistance. While load resistances can be in the range of several ohms during a high-current discharge, the resistance at room temperature may typically be in the sub-ohm range and can be difficult to measure accurately. A plurality of diagnostic devices arranged to enable sufficiently precise measurements may be utilized. For example, the above embodiments may employ a resistance probe such as the custom-built 4-point resistance probe 200 (FIG. 2.) specifically designed and implemented to measure very low value resistance of interest between the inner two pins 210 while compensating for all lead and contact resistances.

Figure 3:
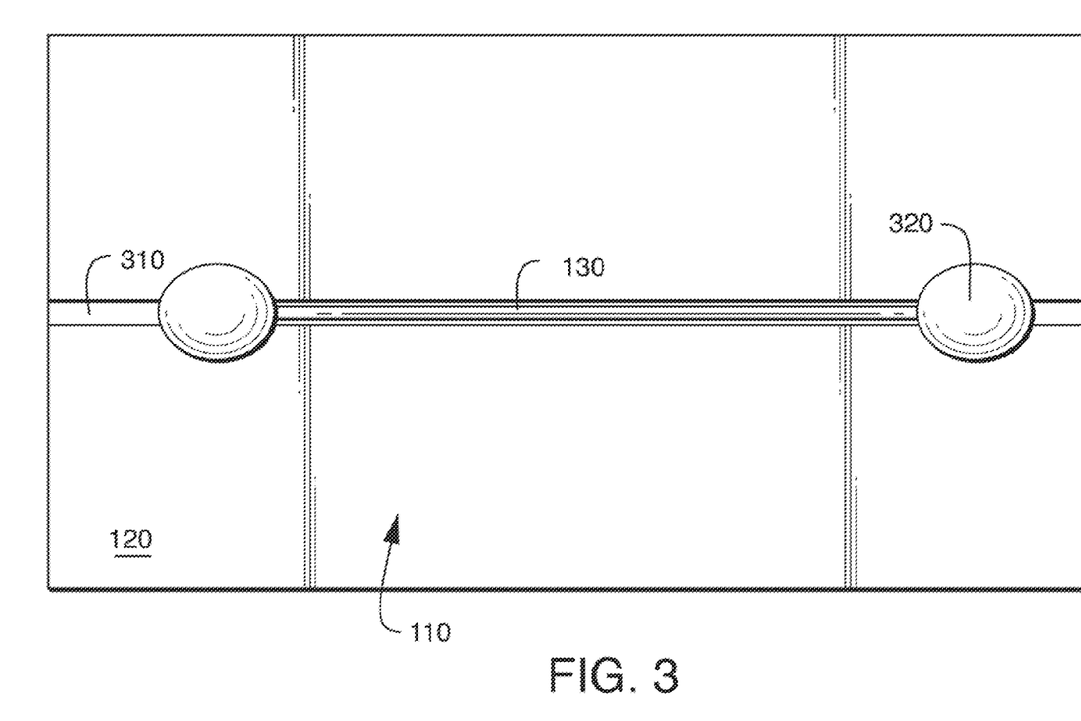
FIG. 3. is an illustration of one embodiment of the current invention.

In addition to the embodiments incorporating embedded resistive loads 110 based on the fired conductive or resistive pastes, different embodiments based on the thick-film approach may be additionally flexible to also allow for the use of ultra-thin wire resistive loads 110 for those embodiments where wire loads may be of interest. This may be accomplished by replacing the conductive paste based resistors 110 in the load inlay region 310 with a thin wire. For example, in the embodiment illustrated in the FIG. 3, a top view of an ultra-thin copper wire thick-film hybrid resistive load 110 is presented. Fine 75 μm copper wire resistor 130 may lay in the narrow inlay channel 310, soldered to two embedded silver paste contact pads 320.

Many known commercial and military electronics systems employ low temperature co-fired ceramic (LTCC) (one of such may be, for example, DuPont Green Tape™ LTCC) 3D substrate structures that may be built up from laminated green tape ceramics and embedded with various components and printed conductive, resistive, or inductive patterns.

Figure 4:
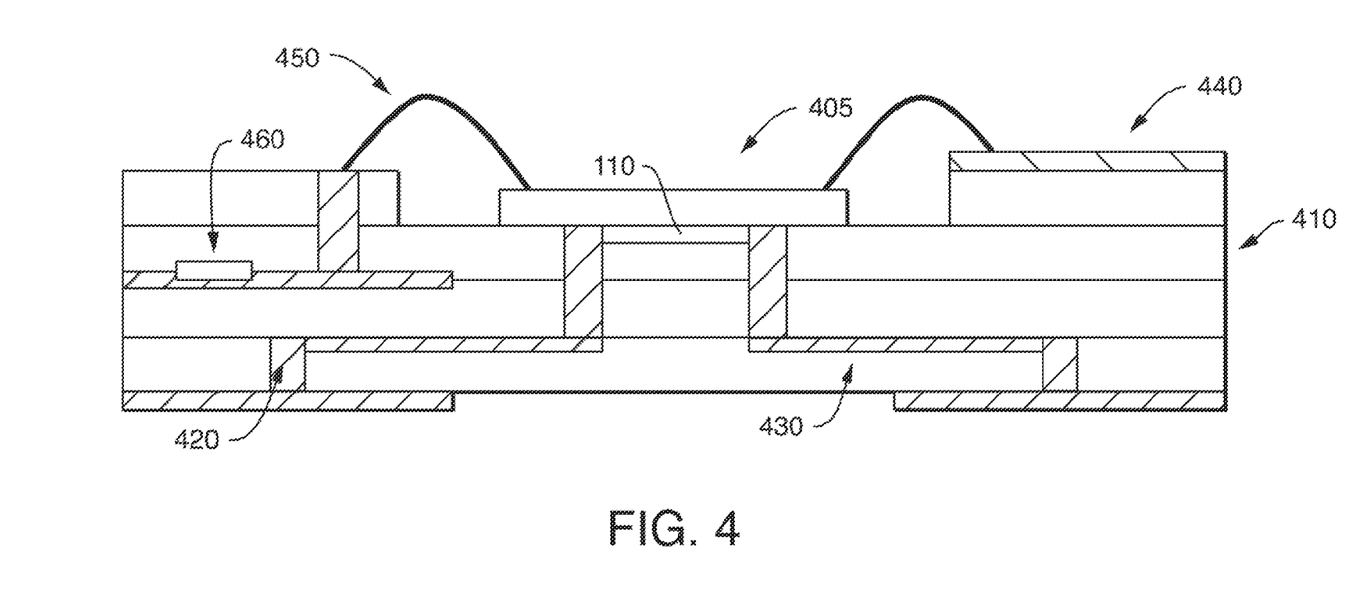
FIG. 4. is an illustration of yet another embodiment of the current invention.

FIG. 4. illustrates a schematic of such a LTCC based system including a possible configuration containing an embedded resistive load 110 for AT protection of a secured microdevice 405 (customarily having a protective cover or encapsulation and an active portion arranged to perform processing and/or storing functions) with information containing regions. In many related embodiments, LTCC green tape constructions having several green tape lamination layers 410, may naturally accommodate additional embedded parts and assemblies, including but not limited to, a plurality of conducting vias 420, internal 430 and external conductors 440, die interconnects 450, or internal electronic elements (for example: resistors, inductors, capacitors, and active devices) 460.

In particular embodiments associated with the schematic representation in FIG. 4, at least a portion of conducting vias 420 and at least a portion of internal conductors 430 have been assembled and insulated utilizing insulation materials enabled to resist high voltage/high current pulses (for example, up to 5 kV and/or up to 100 kA) for sufficient duration time periods to enable significant current to reach the resistive load 110 and to produce sufficient energy dissipation in the resistive load 110 for effective destruction of at least the active portions of the secured microdevice 405. In addition, the insulation of the high voltage portions of the conductors connected to the resistive load 110 has been enabled to prevent additional discharges and/or high current paths (through the volumes or along the boundary surfaces of the layers 410, interconnects 450, and/or the electronic elements 460.

Figure 5A:
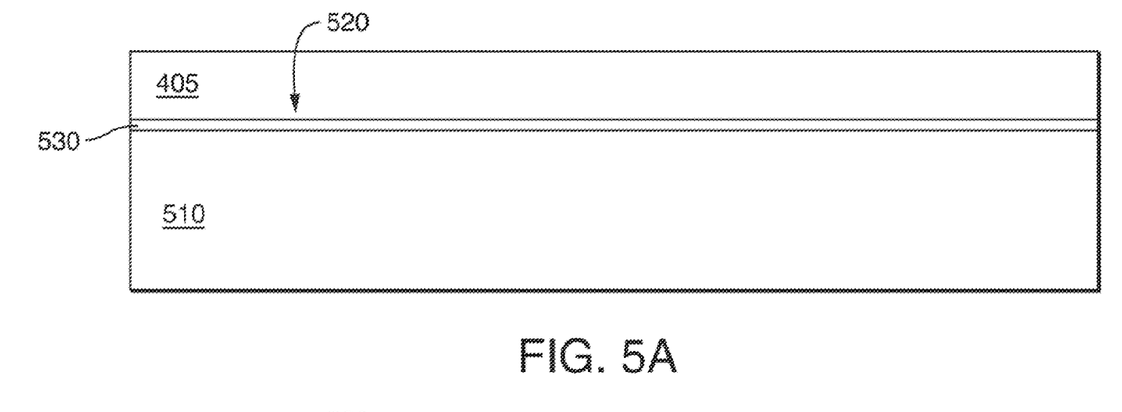
FIG. 5A. is an illustration of yet another embodiment of the current invention.
Figure 5B:
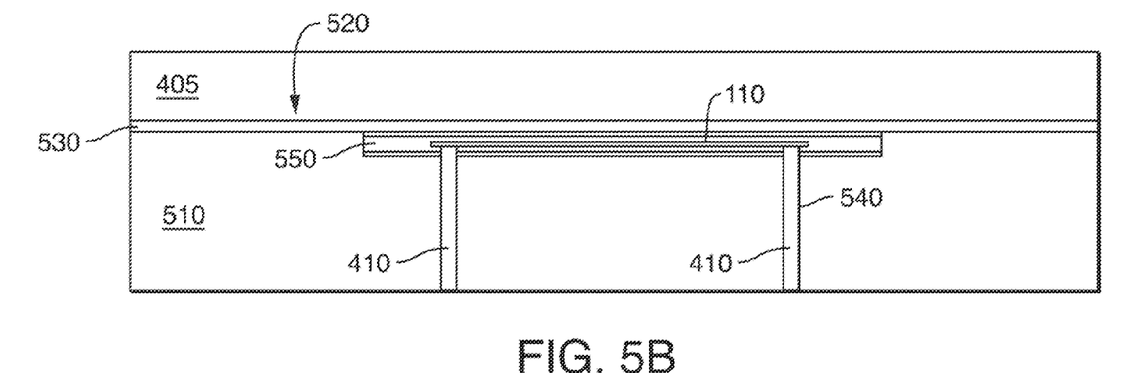
FIG. 5B is an additional illustration of yet another additional embodiment of the current invention.

FIGS. 5A-5B, schematically illustrate 3D embodiments pertinent to high frequency (at least 500 Hz and above) and/or high power microdevices 405 that may benefit from being arranged in the close proximity of a predetermined electrical potential surface 520 as defined, for example, by the conductive plate 530 and/or in contact with a good thermal metallic heat sink 510 arranged for substantially enhanced thermal conduction. In both cases, the resistive load 110 and the high voltage high current connecting electrodes 410 may be insulated from the uniform potential surface conductor and/or the conducting heat sink with electrically. insulating vias 540 or electrically insulating layers surrounding the resistive load 110 that may be enabled to resist high voltage/ high current discharges between the via 420 and/or the resistive load 130 and the remaining portions of the microdevice 405, and conductive plate 530.

In an addition to spark gap switching, such as disclosed in the incorporated patent application Ser. No. 12/191,725, different embodiments of the current invention may utilize electronic switching elements in at least one pulse power system. One such embodiment may utilize the Insulated Gate Bipolar Transistors (IGBT) as the switching element. The IGBT devices may have a simple gate driven characteristics of a MOSFET with the high-current and low forward resistance of bipolar transistors. The issue is that, it may be desirable to find commercial IGBT devices with sufficiently low on-state resistance such that they do rot dominate the discharge impedance of circuits with embedded load impedances, for example, in the range of 1 mΩ to 500 mΩ. For some embodiments, employing multiple IGBT devices connected in parallel may result in an acceptably low resulting on-state resistance of the parallel IGBT arrangement. Having such configurations, the pulse power system may be fired repetitively with acceptable stress on the components even when discharging currents as high as many tens of kA. Furthermore, the on-state impedance of the parallel IGBT arrangement may be significantly below that of the resistive loads of interest.

Figure 6:
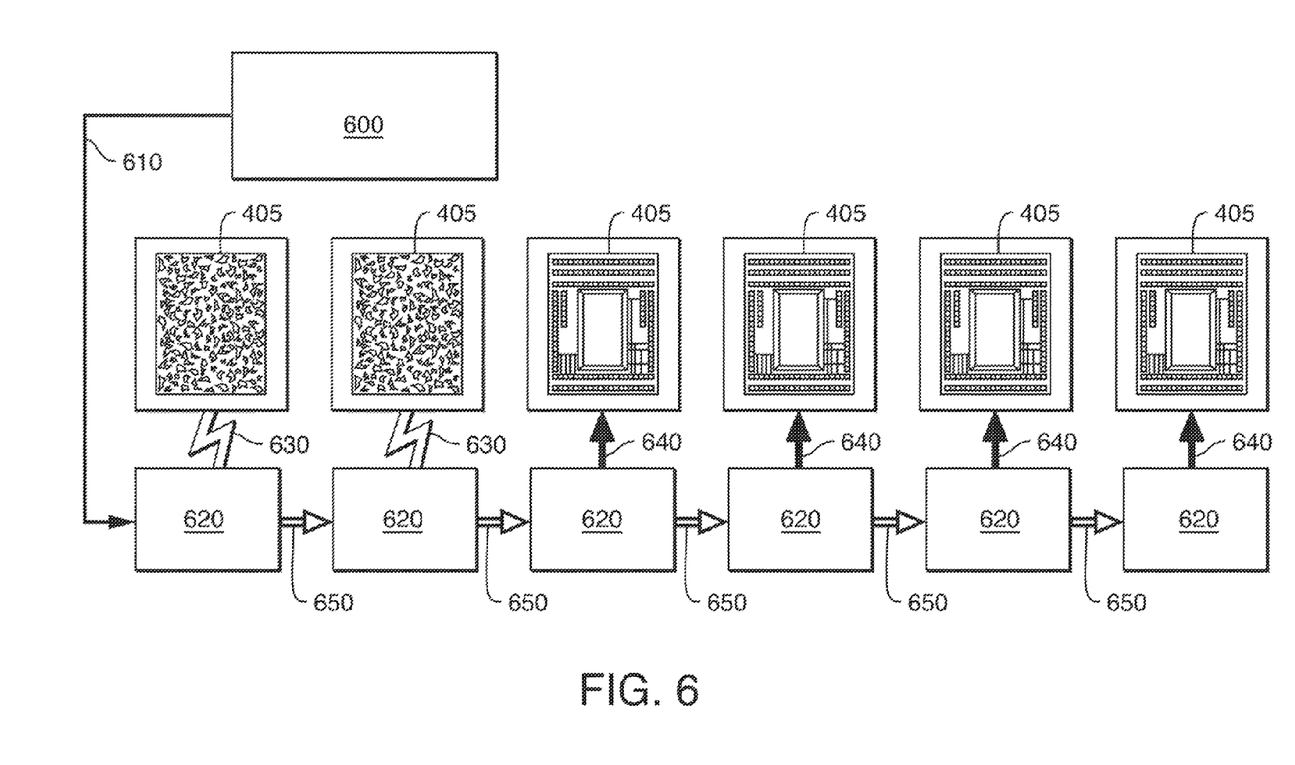
FIG. 6. is an illustration of yet another embodiment of the current invention.

In some embodiments pertinent to the schematic illustration in FIG. 6, at least one obliteration driver 600, arranged to generate a plurality of current pulses may be connected to a plurality of secured microdevices 405. The obliteration driver 600 may be connected to the microdevices 405 using a network 610 (which may incorporate various levels of complexity being arranged in series, parallel, combined, or more complex networking arrangements). In the illustrated embodiments, the network 610 may be substantially serial, additionally incorporating programmable switches 620 and disconnecting elements that may be characterized by substantially nonconductive 630 and conductive 640 states regarding the current pulses from the obliteration driver 600. The programmable switches may be connected using connectors 650 arranged to conduct several subsequent current pulses.

The devices represented by the schematic in FIG. 6, may be operated such that the obliteration driver may be arranged to generate a predetermined number of current pulses through the network 610, while the programmable switches 620 may be preprogrammed to deliver a predetermined number of the current pulses to the resistive loads pertinent to the predetermined processing devices 100 before causing the disconnecting devices to change from initially conductive 640 to nonconductive states 630. Of particular interest may be embodiments in which the disconnecting elements may reliably and verifiably remain in nonconductive states 630 without regard to any subsequent action of the obliteration driver 600, switches 620, or other disconnecting elements either in conductive 640 or nonconductive 630 states. It may be noted that the disconnecting elements in nonconductive stages 630 may be arranged for inhibition of subsequent arcing, surface breakdowns, and or gliding discharges along pertinent component's surfaces during the subsequent current pulses.

It may be also noted that, in different embodiments, the disconnecting elements may be incorporated as integral parts of the obliteration drivers 600, networks 610, switches 620, secured processing devices 100 (of the parent application), or secured microdevices 405. In particular, the disconnecting elements may be arranged as separate resistive loads or portions of the resistive loads 110. In other embodiments, the resistive load 110 may be arranged for dual functionality as a driver of destructive motions obliterating portions of the secured microdevices 405 and a disconnecting element arranged to prevent subsequent electrical discharges over the previously obliterated portions.

One distinct class of embodiments of the current invention incorporates at least one resistive load and at least one coupling structure associated with the resistive load. The portion of stored electric energy delivered to such resistive load or loads and resistively converted into the mechanical energy of motion may be transferred through the at least one coupling structure such that the special/temporal characteristics of the motion are altered in order to enhance the obliteration of the stored information. Thus, the coupling structure may be arranged to enhance matching of mechanical properties of the discharge driven enhanced pressure and the information containing regions of the secured microdevices.

Figure 7A:
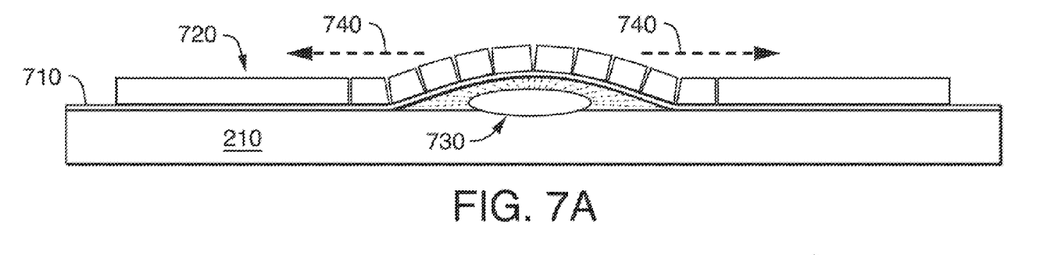
FIG. 7A. is an illustration of yet another embodiment of the current invention.
Figure 7B:
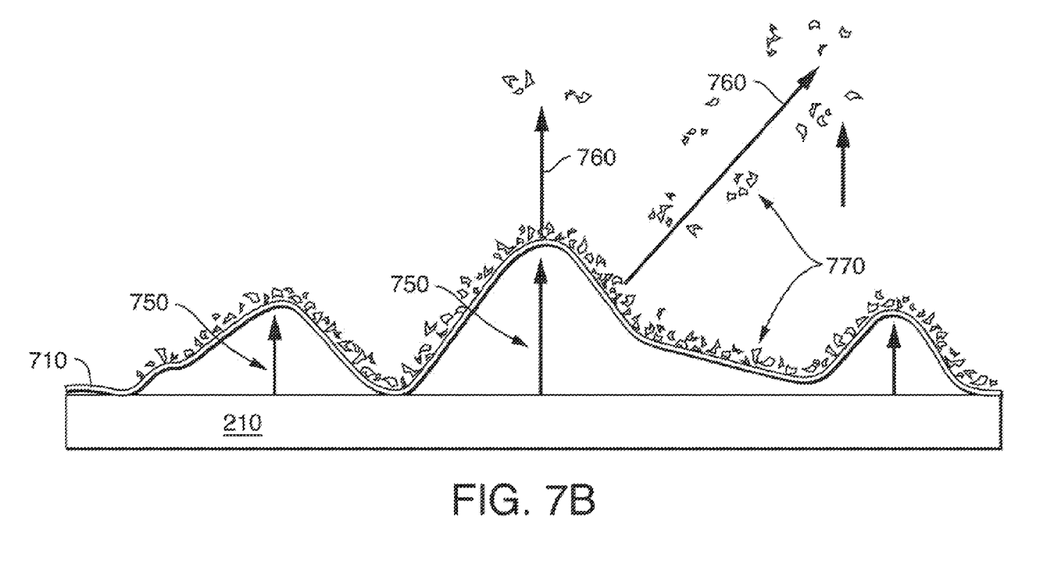
FIG. 7B is an additional illustration of yet another additional embodiment of the current invention.

FIG. 7A-7B illustrated one example of embodiments. In the illustrated embodiment, an elastic coupling member 710 (for example, in a form of an elastic polymer layer; e.g. polyamide films commercially available as Kapton®) may be layered between the substrate 210 and the information containing region 720 storing at least a fraction of the information in the secured microdevice 405. During the energy discharge at the resistive load (not shown in the FIGS. 7A-7B the discharge area 730 of elevated pressure may be created in the proximity of the preexisting resistive load 130. The mechanical energy burst associate with the discharge area 730 (FIG.7a) may deform the coupling member 710 such that the information region 720 that is bonded to the coupling member 710 experiences sufficient stress to produce at least one fracture in the information containing region 720. While the information containing region becomes fractured with the start of deformation of the coupling member it may still remained bonded to the coupling member such that additional deformations of the coupling member may produce additional fracturing and fragmentation of the still bonded information region. The continued deformation of the coupling member away from the preexisting resistive load may resemble a "peeling wave" 740 as the coupling member becomes unbonded from and moves away from the substrate 210. At some point away from the substrate, the coupling member may become sufficiently stretched to produce strong elastic restoring forces that further drive the motion of the coupling member in various directions that further the fracturing, fragmentation, and pulverization of the information containing region. FIG. 7B illustrates resulting phases of the obliteration, in which pulverized fragments 770 of the in formation storage portion 720 may fly away with different velocities 760 (capable to cause secondary damage to the proximal structures), while the coupling member 710 or it's significant sections) exhibits significant displacements 750 which may be associated with subsequent obliterations of the proximal parts.

Figure 8:
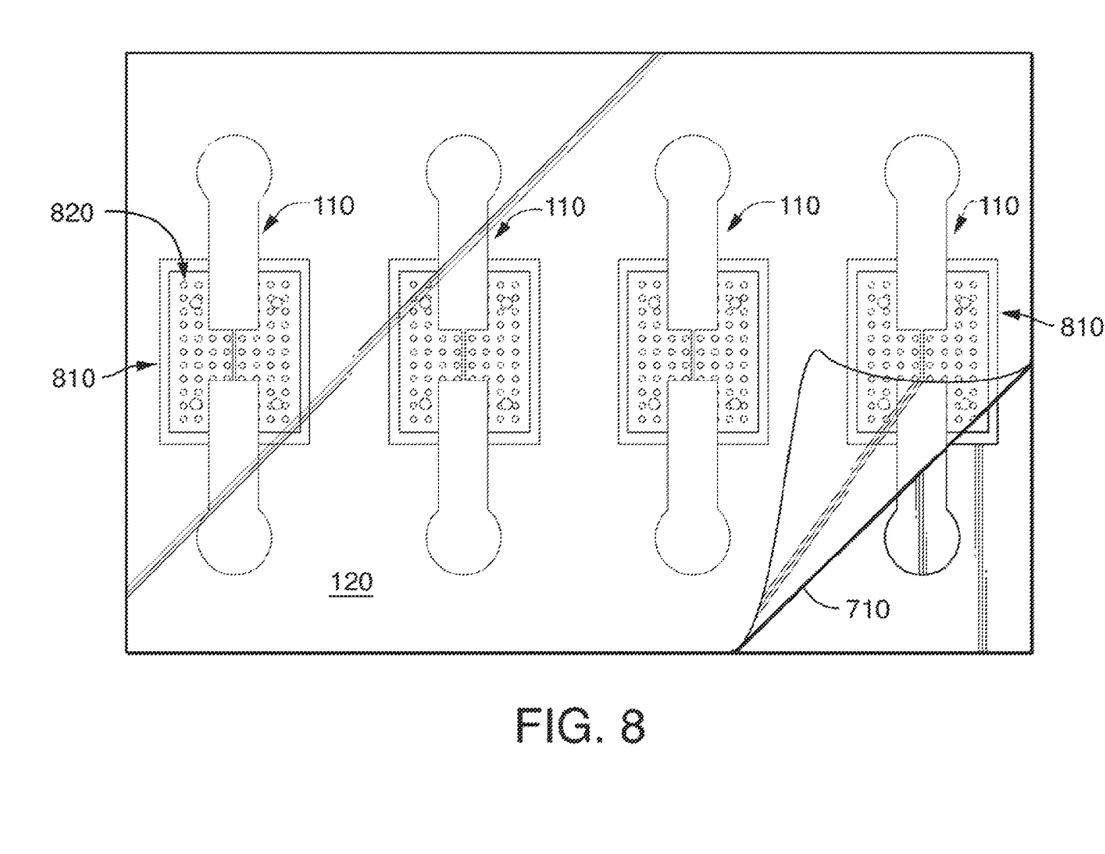
FIG. 8. is an illustration of yet another embodiment of the current invention.

It may be noted that, in different embodiments, the coupling members 710 may be arranged in different 2D or 3D arrangements and sections to enable, for example, appropriate partition of the mechanical energy for targeted obliterations of the storage structures and information. In particular embodiment as illustrated in FIG. 8, a set of four resistive loads 110 on a single substrate 120 may be associated with a single coupling member 710 via at least one adhesive section 810 bounded (at least in proximity of the loads 110) to the substrate 210 using a plurality of localized adhesive particulates ("adhesive dots") 820. In this manner, by designing in appropriate coupling members, choice of an appropriate adhesive, and positioning of the sufficient adhesive dots, one may control some details of mechanical coupling between the coupling member 710 and the substrate 210 in order to favorably influence the obliteration.

Also, one can note that the coupling members 720 (incorporating, for example, conductive, dielectric and or magnetic sections or properties) may be arranged to perform additional functions or add additional capabilities, such as (but not limited to) electrostatic, magnetostatic, and electromagnetic shielding, parasitic impedance and coupling management, and/or thermal transport and temperature management).

The present invention has been described with references to the exemplary embodiments arranged for different applications. While specific values, relationships, materials and components have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

I claim:

1. A system for prevention of tampering, unauthorized use, and unauthorized extraction of information from at least one secured microdevice, comprising:
a control hardware arranged to generate a command to trigger a controlled obliteration of at least a fraction of stored information on the at least one secured microdevice;
an obliteration driver arranged to store electric energy and to generate, when triggered by the control hardware, at least one pulse of electric current;
a circuit arranged to conduct the at least one pulse of electric current toward at least one resistive dissipative load structure arranged in a proximity of the at least the fraction of stored information on the at least one secured microdevice, and connected to controllably release a delivered portion of stored electric energy in the proximity of the at least the fraction of stored information on the least one secured microdevice, such that the at least the fraction of stored information has been obliterated during the controllable release;
wherein, the circuit arranged to conduct the at least one pulse of electric current incorporates at least one resistive load having a localized predetermined resistance such that the delivered portion of stored electric energy is locally resistively converted into a mechanical energy of motion during a time period shorter than a duration of time needed for heat diffusion out a volume in the proximity of the at least the fraction of stored information.

2. The system of claim 1, wherein the at least one resistive load incorporates a resistor having a predetermined resistance defined by processing of a conductive material applying a set of preparatory actions consisting of casting, molding, pressure forming, ablation, extrusion, sintering, printing, film depositing, lithographic forming, cutting, milling, turning, etching, chemically depositing (from vapors, solvents and reactive media), chemical etching, implanting (neutral and ion), plasma processing, and mixtures and combinations of above actions.

3. The system of claim 1, wherein the at least one resistive load is arranged to be embedded into a substrate supporting an information containing region of the at least one secured microdevice.

4. The system of claim 3, wherein the at least one resistive load is arranged in a proximity of a thermally-conductive portion arranged to manage heat removal from the at least one secured microdevice.

5. The system of claim 3, wherein the at least one resistive load is arranged in a proximity of a predetermined potential plane the at least one secured microdevice.

6. The system of claim 3, wherein the at least one conducting via is insulated from the substrate supporting an active portion of the at least one secured microdevice having insulation resistant to electric breakdowns driven by the least one pulse of electric current.

7. The system of claim 1, wherein the circuit arranged to conduct the at least one pulse of electric current incorporates at least one conducting via.

8. The system of claim 1, wherein the at least one resistive load includes at least one test connector configured to connect to at least one testing device.

9. A system for prevention of tampering, unauthorized use, and unauthorized extraction of information from at least one secured microdevice device, comprising:
a control hardware arranged to generate a command to trigger a controlled obliteration of at least a fraction of stored information on the at least one secured microdevice;
an obliteration driver arranged to store electric energy and to generate when triggered by the control hardware, at least one pulse of electric current;
a circuit arranged to conduct the at least one pulse of electric current toward at least one resistive dissipative load structure arranged in a proximity of the at least the fraction of stored information on the at least one secured microdevice, and connected to controllably release a delivered portion of stored electric energy in the proximity of the at least the fraction of stored information on the least one secured microdevice, such that the at least the fraction of stored information has been obliterated during the controllable release:
wherein, the circuit arranged to conduct the at least one pulse of electric current incorporates at least one resistive load having a localized predetermined resistance and at least one coupling structure, such that a delivered portion of stored electric energy is locally resistively converted into a mechanical energy of motion during a time period shorter than a duration of time needed for heat diffusion out a volume in the proximity of the at least the fraction of stored information, transferred through the at least one coupling structure, and controllably applied upon the proximity of the at least the fraction of stored information on the least one secured microdevice, such that the at least the fraction of stored information has been obliterated during the controllable release.

10. The system of claim 9, wherein the least one coupling structure incorporate at least one layered portion arranged substantially in between the at least one resistive load and the at least the fraction of stored information.

11. The system of claim 10, wherein the at least one layered portion incorporates at least one dielectric membrane arranged to cover at least a portion of a substrate.

12. The system of claim 10, wherein the at least one layered portion has been arranged for substantially enhanced thermal conductivity.

13. The system of claim 10, wherein the at least one layered portion has been prearranged to have distributed mechanical properties such that the delivered portion of stored electric energy is locally resistively converted into a mechanical energy of motion, and is predominantly transferred to a predetermined fraction of stored information.

14. A system for prevention of tampering, unauthorized use, and unauthorized extraction of information from at least one secured microdevice, comprising:
- a control hardware arranged to generate a command to trigger a controlled obliteration of at least a fraction of stored information on the at least one secured microdevice;
- an obliteration driver arranged to store electric energy and to generate, when triggered by the control hardware, at least two distinct pulses of electric current
- a circuit arranged to conduct the at least two distinct pulses of electric current toward at least two resistive dissipative load structures arranged in a proximity of the at least the fraction of stored information on the at least one secured microdevice, and connected to controllably release delivered portions of stored electric energy in the proximity of the at least the fraction of stored information on the least one secured microdevice, such that the at least the fraction of stored information has been obliterated during the controllable release;
- wherein, the circuit arranged to conduct the at least two distinct pulses of electric current incorporates a plurality of resistive loads each having a localized predetermined resistance and at least one disconnecting element, such that the portion of stored electric energy, delivered by at least one pulse of electric current, is locally resistively converted into a mechanical energy of motion during a time period shorter than a duration of time needed for heat diffusion out of a volume in the proximity of the at least the fraction of stored information while switching the at least one disconnecting element into an open non-conductive state regarding any subsequent pulse of electric current.

15. The system of claim 14, wherein the obliteration driver arranged to store electric energy and to generate, when triggered by the control hardware, a predetermined number of distinct pulses of electric current.

16. The system of claim 14, wherein the circuit arranged to conduct the at least two distinct pulses of electric current incorporates a plurality of resistive loads arranged in a network of the plurality resistive loads and the at least one disconnecting element.

17. The system of claim 16, wherein the obliteration driver incorporates electric energy storage device and generates, when triggered by the control hardware, a predetermined number of distinct pulses of electric current.

18. The system of claim 15, wherein the at least two disconnecting elements, each of the at least two disconnecting elements having either at least one conductive state and at least one nonconductive state, are connected to at least one programmable switch such that a sequence of the predetermined number of distinct pulses of electric current drives a sequence of transitions between the at least one conductive state and the at least one nonconductive state of each of the at least two disconnecting elements.

19. The system of claim 14, wherein the at least one disconnecting element incorporate segments arranged to inhibit surface breakdowns and gliding discharges.

* * * * *